R. B. PRICE.
FABRIC FOR TIRES AND THE LIKE.
APPLICATION FILED JAN. 3, 1912.
1,193,715.
Patented Aug. 8, 1916
2 SHEETS—SHEET 1.
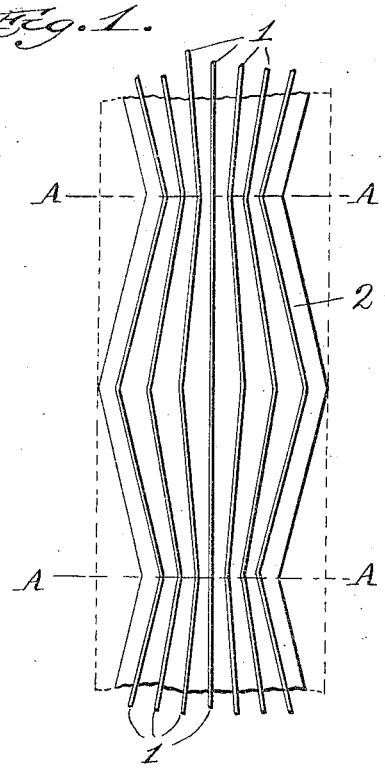
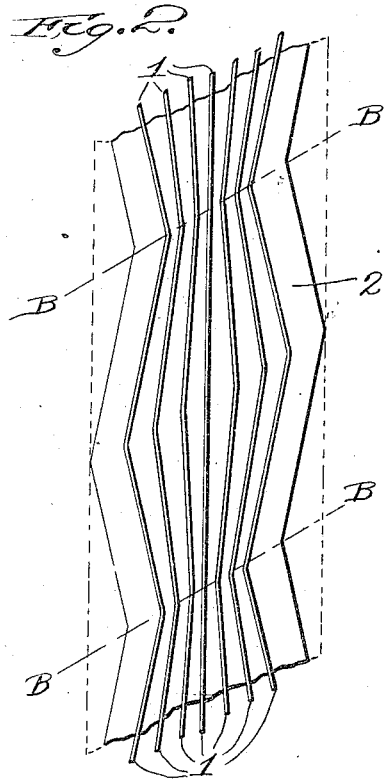
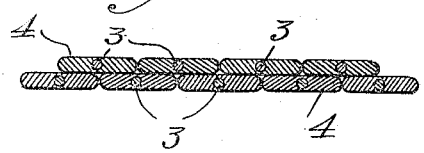

UNITED STATES PATENT OFFICE.

RAYMOND B. PRICE, OF MISHAWAKA, INDIANA, ASSIGNOR TO RUBBER REGENERATING COMPANY, A CORPORATION OF INDIANA.

FABRIC FOR TIRES AND THE LIKE.

1,193,715.

Specification of Letters Patent.    Patented Aug. 8, 1916.

Application filed January 3, 1912. Serial No. 669,210.

*To all whom it may concern:*

Be it known that I, RAYMOND B. PRICE, a citizen of the United States, residing at Mishawaka, in the county of St. Joseph, State of Indiana, have invented new and useful Improvements in Fabrics for Tires and the like, of which the following is a specification.

My invention relates to certain improvements in the production of fabric, particularly intended for use in connection with automobile tires and similarly shaped articles, and has for its object to provide a fabric treated with rubber in which the strands or threads will be disposed, when said fabric is applied, in lines converging toward the inner periphery of said tire.

Figure 4:
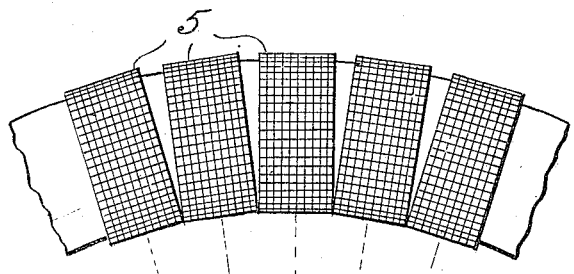
Figure 5:
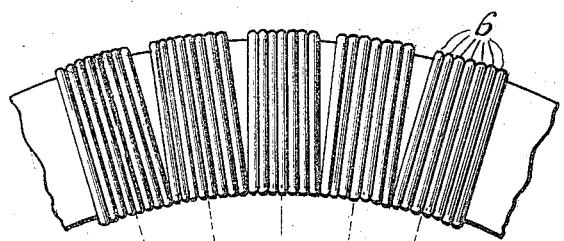

In the accompanying drawing: Figure 1 is a diagrammatic view illustrating one form of my improvement. Fig. 2 is a similar view illustrating a slightly modified form. Fig. 3 is a transverse sectional view of still another modification. Fig. 4 is an elevation of a portion of a tire core or mandrel showing a modified construction of fabric applied thereto. Fig. 5 is a similar view showing still another modification.

In the said drawing, referring more particularly to Fig. 1, the same illustrates a length of my improved fabric, which may be produced in indefinite lengths and subsequently for use severed into suitable short lengths. Thus, for use in connection with automobile tire shoes, and when intended to be disposed radially thereon, the said fabric is preferably to be cut transversely into lengths along the lines A—A, said lengths so formed being substantially equal to the transverse circumference of the tire with which they are to be used.

In an application filed by me January 19, 1912, Serial No. 672,261, I have described an improved method of treating fiber, strands and threads to increase their tensile strength, and in the formation of my present fabric I contemplate the use of strands or threads so treated. It will be observed that in said fabric, in which the strands or threads indicated at 1 are preferably the treated strands or threads of my application hereinbefore referred to, said strands or threads are so disposed that at the lines A—A they are brought comparatively close together and that between said points A—A they diverge to points of greatest separation equidistant from said lines A—A, this divergence being governed by the diameter of the wheel of the tire on which said sections are to be applied. The strands or threads so disposed have applied thereto, preferably on one side only, a layer of rubber 2, into contact with which said strands or threads are pressed, and the resultant fabric then vulcanized to set said strands or threads in position. I have shown in dotted lines, Figs. 1 and 2, the outline of the layer of rubber 2 used in forming the strip, which may then be trimmed along its edges as shown in full lines to follow the lines of the outermost strands or threads 1. When severed along the lines A—A, and the sections so formed applied in an automobile tire, it will be found that each strand or thread is disposed substantially radial to the wheel hub of the tire, so that when strain is applied to the tire there will be no tendency of said strands or threads to creep longitudinally of the tire. Furthermore, inasmuch as there is no overlapping of said strands or threads with other strands or threads, as where a woven fabric is employed, it will be found that as said strands or threads lie unbent, except as to the configuration of the tire, they are in position to exert a maximum of resistance.

I also contemplate disposing my improved material diagonally or on the bias in the tire, and under such circumstances dispose the strands or threads as illustrated in Fig. 2, wherein the lines of severance are indicated at B—B, the strands or threads 1 being so disposed, as shown, as to cause the line of greatest divergence of the strands to lie parallel with said lines of severance.

It will be understood that, instead of severing the material along each line A—A or B—B, said severance may occur along each alternate or each third line or at any intermediate point, so that the sections may be folded back upon themselves to make as many thicknesses from a single strip of the material as may be desired. In thus folding the material, as well as when a single unit length is used, the material may be looped at the fastening edges around one or more suitable longitudinally disposed retaining cords or wires.

In Fig. 3 I have illustrated a modified construction, wherein individual cords 3 are employed, said cords being each previously treated to be inclosed in an oval-shaped envelop 4 of rubber, as shown, each said cord and envelop thus presenting in cross section two flattened sides. In practice said cords are disposed upon the core with their envelops preferably in contact with each other in one or more layers, and the cords of said layers are preferably staggered with respect to each other. Preferably the cords are disposed so that their flattened sides lie toward the core at the tread of the the, and they are then twisted so that their thin edges face the core at the attaching edges, and are fastened as in the manner hereinbefore described, or in any other suitable manner. If desired, said cords, instead of being disposed continuously in contact with each other, may be arranged in groups, each group embodying a plurality of cords.

I also contemplate employing a series of strips of material in which the threads of the fabric 5 employed lie radial and at right angles to the radial line, as shown in Fig. 4. In this construction the strips are disposed on the core in one or more layers, which may be in register, as shown, or overlapping or staggered, as desired.

In Fig. 5 I have shown still another modified form, in which separate rubbered cords 6 are employed, the same being arranged in groups composed each of as many cords as may be desired. Said groups are disposed to lie, as groups, radially with respect to the wheel hub, which will of necessity leave tapered intervening spaces between said groups, as shown, though their inner edges may be in contact, if desired. And this arrangement of fabric strips, as well as this grouping arrangement of cords, may be disposed on the core diagonally at any desired angle or angles.

In place of the fabric shown in Fig. 4 I may employ strips of tape, braided, knit, or otherwise constructed and treated or not.

Having thus described my invention, what I claim as new and desire to secure by Letters Patent is:

1. A fabric for tires and the like embodying therein a plurality of independent adjacent and non-intersecting strands, or threads, or groups thereof, of a length to extend lengthwise about a tire or other annular body, transversely thereof, and converging toward their opposite ends, whereby when applied to a tire or other annular body each will extend in the plane of a radius of said tire or other annular body.

2. A fabric for tires and the like embodying therein a plurality of independent sections, each of a length to extend lengthwise about a tire or other annular body, transversely thereof, each section having therein a plurality of independent strands or threads extending lengthwise thereof and converging toward their opposite ends whereby when applied to a tire or other annular body each will extend in the plane of a radius of said tire or other annular body.

3. A fabric for tires and the like embodying therein a vulcanizable plastic base of a length to extend lengthwise about a tire or other tubular annular body, transversely thereof, and a plurality of independent strands or threads embedded in said plastic base and extending longitudinally thereof, said strands or threads converging toward opposite ends thereof whereby each strand or thread, when said base is applied to a tire or other annular body, will lie in the plane of a radius of said tire or other annular body.

In testimony whereof, I have hereunto set my hand in the presence of two subscribing witnesses.

RAYMOND B. PRICE.

Witnesses:
GEO. A. COLSON,
A. M. DISCH.